United States Patent [19]

Bethuel et al.

[11] Patent Number: 4,636,290

[45] Date of Patent: Jan. 13, 1987

[54] LIQUID-LIQUID EXCHANGERS AND PROCESS OF USING

[75] Inventors: Louis Bethuel, Pierrelatte; Laurent Martin, Bourg St Andeol; Thierry Dujardin, Biviers, all of France

[73] Assignee: Commissariat a l'Energie Atomique, Paris, France

[21] Appl. No.: 620,180

[22] Filed: Jun. 13, 1984

[30] Foreign Application Priority Data

Jun. 22, 1983 [FR] France ............... 83 10821

[51] Int. Cl.[4] .................. B03C 5/00; B03C 5/02
[52] U.S. Cl. .................. 204/186; 204/302; 204/306
[58] Field of Search .................. 204/302–308, 204/156, 140

[56] References Cited

U.S. PATENT DOCUMENTS

| 2,835,687 | 5/1956 | Clewett et al. ............... 260/429.1 |
| 2,874,111 | 2/1959 | Waterman ..................... 204/306 |
| 3,574,085 | 4/1971 | Woelflin ....................... 204/306 |
| 3,592,752 | 7/1971 | Pfeifer ......................... 204/306 |
| 3,620,959 | 11/1971 | Murdock, Sr. ............... 204/302 |
| 3,704,222 | 11/1972 | Kusovsky et al. ........... 204/306 |
| 4,161,439 | 7/1979 | Warren et al. ............... 204/306 |
| 4,182,672 | 1/1980 | Martin ......................... 204/302 |
| 4,374,724 | 2/1983 | Robinson ..................... 204/302 |
| 4,402,818 | 9/1983 | Oberton ....................... 204/302 |
| 4,419,200 | 12/1983 | Hsu et al. ..................... 204/186 |

FOREIGN PATENT DOCUMENTS

| 532402 | 1/1941 | United Kingdom . |
| 702545 | 1/1954 | United Kingdom . |
| 901610 | 6/1962 | United Kingdom . |
| 0571504 | 9/1977 | U.S.S.R. ..................... 204/306 |

Primary Examiner—John F. Niebling
Assistant Examiner—Terryence Chapman
Attorney, Agent, or Firm—Oblon, Fisher, Spivak, McClelland & Maier

[57] ABSTRACT

Liquid-liquid exchanger where a dispersed phase circulates also in a continuous phase, wherein an electrocoalescer is placed in that part of the exchanger located between the dispersed phase inlet and the continuous phase outlet.

Application to the separation of uranium isotopes by chemical exchange.

10 Claims, 3 Drawing Figures

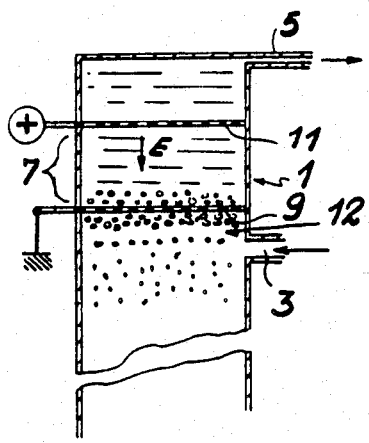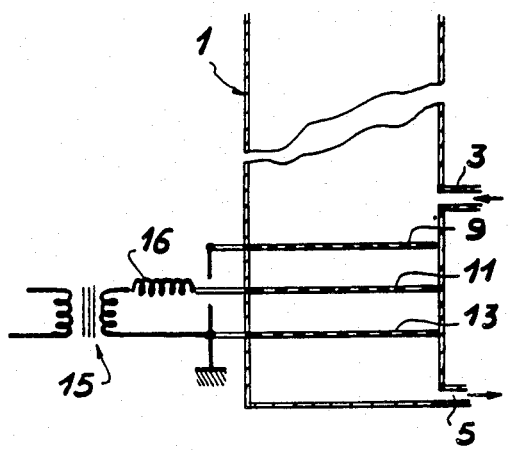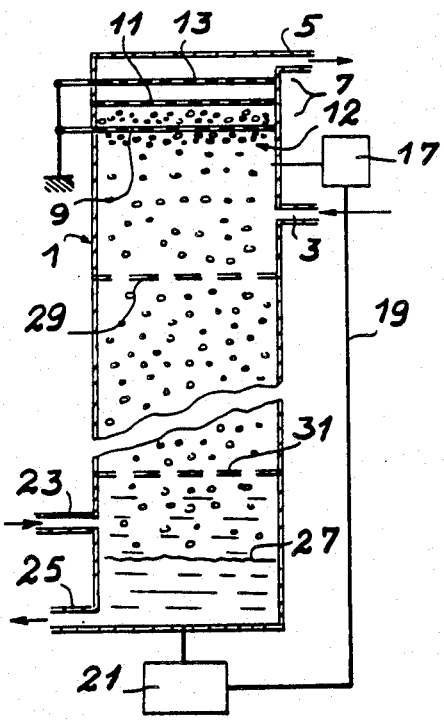

LIQUID-LIQUID EXCHANGERS AND PROCESS OF USING

BACKGROUND OF THE INVENTION

The present invention relates to an improvement in liquid-liquid exchangers, particularly extraction columns, of the type in which a dispersed phase circulates in a continuous phase in countercurrent or counterflow form.

It uses known procedures of electrostatic settlers for the separation of the emulsions, i.e. settlers provided with electrodes producing an electric field ensuring the coalescence of the drops of the emulsion. Such equipment is widely used in water in oil separation.

U.S. Pat. No. 4,161,439 proposes a multistage liquid-liquid exchanger comprising, in regularly distributed manner, dispersion and electrocoalescence zones, i.e. zones in which are produced electrical fields respectively, ensuring the dispersion and coalescence of the drops of the dispersed phase.

The exchanger described in this patent has a single column in which, in the active part, is located a plurality of electrocoalescers and effective separation of the two liquids leaving the column is not sought, so that it is possible to associate several exchange or rectifying columns in series.

It is known that the performance levels of liquid-liquid exchangers having a dispersed phase in a continuous phase increase with the size of the specific interfacial area of contact between the two phases. They must operate with a high retention level which, unfortunately, can lead to a significant entrainment of the dispersed phase in the continuous phase leaving the exchanger.

SUMMARY OF THE INVENTION

The simple and very effective improvement proposed by the present invention makes it possible to stop the entrainment of the fine droplets of the dispersed phase and consequently ensure its recycling into the exchanger. More specifically, the invention consists of a liquid-liquid exchanger, wherein an electrocoalescer is placed in that part of the exchanger located between the dispersed phase inlet and the continuous phase outlet.

The electrocoalescer according to the invention has at least two electrodes, one of which is placed in the vicinity of the dispersed phase inlet and is connected to ground, while the other is live.

The electrical field generated by the electrocoalescer positioned, according to the invention, in said part of the exchanger, makes it possible to stop entrainment of all the fine droplets due to the countercurrent of the phases and their circulation relative to the electrodes. Thus, in the vicinity of the electrocoalescer electrode, there is a high retention zone (e.g. 80%), which behaves in the manner of a porous medium. The drops of the dispersed phase, which have increased in size under the action of the electrical field, trap the fine droplets which could be entrained by the continuous phase. Thus, the size of the drops continues to grow within this zone until they are again able to move in countercurrent of the continuous phase and thus reach the active part of the exchanger.

It is consequently possible to operate the exchanger very close to clogging or obstruction without significant entrainment of the dispersed phase. This makes it possible to increase the average retention level, as well as the flow rates of the two phases. As there is virtually no entrainment of the dispersed phase by the continuous phase, the improvement provided by the invention makes it possible to associate several exchangers, when the entrainment at the outlet of one is liable to deteriorate the satisfactory operation of the following exchanger.

Moreover, the exchanger according to the invention operates with a low field intensity, the high density of the drops making the electrocoalescence intense, even in a weak field.

According to the invention, the continuous phase must not be too conductive, because it is necessary to maintain an electrical field which is at least equal to a few volts/centimeter.

In preferred manner, the exchanger according to the invention is in the form of a column (spraying, pulsed, Kühni). The location of the electrocoalescer in the column is a function of the liquid treated. Thus, if the continuous phase is the lighter, the electrocoalescer is placed at the top of the column, whereas it is located at the bottom thereof when the dispersed phase is less dense.

According to a preferred embodiment of the invention, the electrocoalescer has two electrodes connected to ground surrounding a live voltage.

According to another preferred embodiment, the electrocoalescer according to the invention is associated with a means for ensuring the retention level in that part of the exchanger located between the dispersed phase inlet and the electrocoalescer. This measuring means is defined as a function of the phases present (pressure measurement, conductivity measurement of the two-phase mixture).

This measuring means makes it possible to determine in a sensitive manner the proximity of clogging and to control in a very stable manner the operation of the column by acting on its operating parameters (flow rates, amplitude or frequency of the pulser, interelectrode voltage, etc).

BRIEF DESCRIPTION OF THE DRAWINGS

The invention is described in greater detail hereinafter relative to non-limiting embodiments and with reference to the attached drawings, which show:

FIG. 1 the principle of the invention.

FIG. 2 in section, a liquid-liquid exchange column according to the invention.

FIG. 3 in section, an exchange column having a retention level measuring means permitting the control of the exchange column.

DETAILED DESCRIPTION OF THE PREFERRED EMBODIMENTS

In order to explain the principle of the invention, FIG. 1 shows the top of a liquid-liquid exchange column 1 in which circulates in countercurrent manner a light continuous phase and a denser dispersed phase.

According to the invention, an electrocoalescer 7 comprising two electrodes in the form of perforated graphite plates are positioned between the dispersed phase inlet 3 and the continuous phase outlet 5. These two electrodes 9 and 11, which are positioned perpendicularly to the axis of the column, produce an electrical field $\vec{E}$ within the column. Electrode 9, which is closest to the dispersed phase intake is connected to ground, while the other electrode 11 is live.

In operation, the droplets entrained by the continuous phase coalesce under the action of the electrical field, accumulate in the vicinity of electrode 9 and consequently produce a high retention level zone 12 which traps the smallest droplets. This has the effect of increasing their size and when they reach an adequate size, they drop again into the column in countercurrent with the continuous phase.

FIG. 2 shows exchange column 1 within which are arranged two electrodes, to which is added a regrounding system. In this case, it is assumed that the continuous phase is denser, i.e. its evacuation takes place via the lower end of exchange column 1.

The dispersed phase enters column 1 by pipe 3. The continuous phase leaves by pipe 5. Electrodes 9 and 11 are positioned on the same side as the dispersed phase intake and occupy two horizontal sections spaced by 1 to 50 and preferably 10 to 15 cm and permit the passage of the phases. They are constituted by perforated graphite plates. The size of the orifices must not be too large to ensure that a dispersed phase stream, when the latter is a good conductor of electricity, does not pass through electrode 9 without touching it and consequently renders live all the emulsion in the column. In the present embodiment, the perforations of the electrodes have a diameter of less than 1/20 of the column diameter, the transparency of the electrodes being approximately 40%.

Electrode 11 is polarized by means of transformer 15. Electrode 9, closest to the dispersed phase inlet is connected to ground, as shown in the drawing.

The regrounding of the continuous phase after passage through the electrocoalescer takes place by providing an electrode 13, which is connected to ground. The column zone between the two grounded electrodes 9 and 13 must be insulated from the outside.

The effective supply voltage is between a few volts and 380 volts. The apparatus maintains an entrainment level below 0.1% on the basis of a filed of a few volts/centimeter, which can be direct, alternating or in the form of periodic pulses.

In normal operations, the bed of droplets is closed to the electrode adjacent to the dispersed phase inlet. The consumed power P is equal to:

$$P = \frac{\Delta V^2}{d\rho}$$

w/m² of the cross-section of the column
$\Delta V$ ddp interelectrodes (V)
d interelectrode spacing (m)
$\rho$ resistivity of the continuous phase ($\Omega \cdot m$).
The power P is generally very low.

There can accidentally be a rise of the bed of droplets coming into contact with the live electrode. Its conductivity is close to that of the dispersed phase, which is often very conductive. It is then no longer possible to apply the normal operating voltage. Rather than cancel out this voltage, it is perferable, in order to make its subsequent restoration automatic, to adopt a voltage generating system having a voltage-current characteristic which rapidly decreases, while maintaining a low voltage below 50 V. For this purpose is introduced into the circuit a per se known means, such as an appropriate electronic system, or a resistor, or in alternating current an induction coil 16, or a saturatable transformer. Another means consists of covering the electrodes with a suitable insulating material covering, which prevents any short-circuit via the dispersed phase droplets and does not reduce the intensity of the field between the electrodes under normal operating conditions.

It is then necessary to act on the operation of the column to bring about a lowering of the bed of droplets and to reestablish the nominal voltage.

In FIG. 3, column 1 has measuring means 17 placed between the inlet of dispersed phase 3 and the electrocoalescer 7 constituted by three electrodes 9, 11 and 13. In this case, measuring means 17 controls the pressure at the dense bed 12 located between electrode 9 and the inlet of dispersed phase 3.

A small variation in the average retention level in the column leads to a larger variation of the retention level of the dense bed 12. This amplifier effect, controlled by measuring means 17, makes it possible to control the phase agitating device. In this case, the measuring means 17 acts, via connection 19, on a pulser 21 located at the bottom of the column. The frequency or amplitude of the pulsations is then corrected as a function of the average retention level of the exchange column.

In operation, the continuous phase enters column 1 by pipe 23 and leaves it by pipe 5, while the dispersed phase enters the column by 3 and leaves it by 25. The column bottom interface is shown at 27. 29 and 31 are respectively the first and last trays of the exchange column.

During the exchange, an increase in the retention level of dense bed 12 means that column 1 is receiving too much dispersed phase so that, via 17 and 19, there is a reduction in the pulsations of pulser 21 (amplitude of frequency).

In the opposite case, if the retention level of the dense bed 12 decreases, measuring means 17 records this variation and allows more dispersed phase to enter the column, while the pulsations of pulser 21 increase.

The above description has mainly described liquid-liquid exchange columns. Obviously, the invention could also apply to other types of exchangers, e.g. mixer-settlers. For this purpose, it is necessary to provide a settler whose geometry is close to that of the top of an exchange column, the electrodes then serving the same functions as hereinbefore described.

The liquid-liquid exchangers according to the invention can be used in hydrometallurgy, particularly for the separation of rare earths due to the possibility of associating a group of exchange columns in series without any transfer of dispersed phase from one column to the next. They can also be used in the isotopic separation of uranium by chemical exchange. Thus, the operation of each has an average retention level with is 20 to 30% higher, whilst maintaining an entrainment level below 0.1%.

Moreover, reference has been made hereinbefore the graphite plates, but obviously the electrodes could be made from conductive metallic materials (grids, fabrics, bars), conductive polymers, or insulant-covered conductive material.

What is claimed is:
1. A liquid-liquid exchanger containing a dispersed phase circulating in a counterflow manner relative to a continuous phase, which comprises:
   a column;
   a dispersed phase inlet and outlet and a continuous phase inlet and outlet connected to said column said that said dispersed phase and said continous phase flow in a counterflow manner, said dispersed phase inlet being connectable to a source of a dispersed phase; and a perforated electrocoalescer which comprises at least two electrodes, one of which is connected to ground while another is live, said electrodes being positioned in said column perpendicularly to the axis of said column such that when said dispersed phase is flowing in counterflow manner relative to a continuous phase, substantially all of said continuous phase passes through said electrocoalescer and small droplets of the dispersed phase are coalesced to form larger droplets and the volume of said larger droplets increases to a point where they are able to move in a direction away from said continuous phase outlet and then reach a part of said exchanger positioned between the dispersed phase inlet and the continuous phase inlet, thereby diminishing entrainment of said dispersed phase by said continuous phase.

2. A liquid-liquid exchanger according to claim 1, wherein the electrocoalescer comprises two electrodes connected to ground, surrounding a live electrode.

3. A liquid-liquid exchanger according to claim 1, wherein it comprises a retention level measuring means attached to that part of the exchanger between the dispersed phase inlet and the electrocoalescer.

4. A liquid-liquid exchanger according to claim 3, wherein the measuring means determines the pressure.

5. A liquid-liquid exchanger according to claim 3, wherein the measuring means determines the conductivity of the dispersed phase and continuous phase.

6. A liquid-liquid exchanger according to claim 1, wherein it is constituted by at least one pulsed column.

7. A liquid-liquid exchanger according to claim 1, wherein it is constituted by at least one spraying column.

8. A liquid-liquid exchanger according to claim 1, wherein it is constituted by at least one Kühni column.

9. A process for removal of entrained droplets of a dispersed phase in a continuous phase, which comprises:

providing a column; said column having connected thereto a dispersed phase inlet and outlet and a continous phase inlet and outlet;

connecting said dispersed phase inlet to a source of a dispersed phase; said column having a perforated electrocoalescer which comprises at least two electrodes, one of which is connected to ground while another is live, said electrodes being positioned perpendicularly to the axis of said column such that when said dispersed phase is flowing in counterflow manner relative to said continuous phase, small droplets of the dispersed phase are coalesced to form larger droplets which are able to move in a direction away from said continuous phase outlet and then reach a part of said exchanger positioned between the dispersed phase inlet and the continuous phase inlet, thereby diminishing entrainment of said dispersed phase by said continous phase;

introducing a continuous phase into said column by way of said continous phase inlet;

introducing a dispersed phase into said column in a counterflow manner to said continuous phase by way of said dispersed phase inlet;

drawing off said dispersed phase by way of said dispersed phase outlet;

passing substantially all of said continuous phase through said electrocoalescer with removal of entrained droplets of said dispersed phase; and drawing off by way of said continuous phase outlet a coalesced phase.

10. The process of claim 9, wherein said dispersed phase comprises uranium and isotopes thereof.

* * * * *